United States Patent [19]

Collins et al.

[11] 4,408,149

[45] Oct. 4, 1983

[54] SELF-OPTIMIZING VOLTAGE CONTROL OF AN INDUCTION MOTOR

[75] Inventors: Thomas W. Collins; Charles L. Croskey, both of State College, Pa.

[73] Assignee: Optimizer Control Corporation, Burnsville, Minn.

[21] Appl. No.: 300,391

[22] Filed: Sep. 8, 1981

[51] Int. Cl.³ .............................................. H02P 1/44
[52] U.S. Cl. .................................. 318/729; 318/798; 318/805; 318/809
[58] Field of Search ................ 318/729, 798, 805–807, 318/809–812, 438

[56] References Cited

U.S. PATENT DOCUMENTS 4,026,251  5/1977  Schweitzer et al. ................ 364/158
4,130,863  12/1978  Schweitzer et al. ................ 364/158
4,249,120  2/1981  Earle .................................... 318/729

Primary Examiner—J. V. Truhe
Assistant Examiner—Patrick Keane
Attorney, Agent, or Firm—Orrin M. Haugen; Thomas J. Nikolai

[57] ABSTRACT

An adaptive control system for improving the efficiency of an electric motor. Connected in series with the motor and across the voltage supply is an electronic bi-directional switch which may be triggered at differing times relative to the zero-crossing of the AC supply to thereby control the amount of time during each cycle that the motor is energized. The firing angle for the electronic switch is determined by an optimizing network which functions to introduce a relatively low frequency perturbation in the firing angle and means for sensing the effect of that change on the average power being drawn by the system during the period of the perturbation. If this small, periodic change in the firing angle of the electronic switch results in a decrease in average power consumption, the firing angle is adjusted in a direction which is determined to have precipitated the improvement. Alternatively, if the shift in firing angle occasioned by the minute perturbation resulted in a worsening of motor performance, i.e., higher power consumption, the system functions to adjust the firing angle in an opposite direction so that, again, overall performance is improved.

10 Claims, 5 Drawing Figures

SELF-OPTIMIZING VOLTAGE CONTROL OF AN INDUCTION MOTOR

BACKGROUND OF THE INVENTION

I. Field of the Invention

This invention relates generally to electric motor control apparatus, and more specifically to an adaptive, closed-loop control system for improving the efficiency of AC motors subjected to varying mechanical load conditions.

II. Discussion of the Prior Art

In the U.S. Pat. No. 4,052,648 to Nola, there is described a non-adaptive control arrangement for an AC induction motor in which applied voltage and motor current are sampled, with the phases of the samples being compared such that a control signal, representative of the phase difference, is obtained. This control signal is then employed to vary the duty cycle of the applied voltage to thereby regulate phase difference and improve the power factor to a more optimum state when previously the motor had been operating at a less than optimum relationship between line voltage and motor load. In the Nola arrangement, it is required that the optimum phase lag for the particular motor in question to be known and this optimum value varies from motor to motor. The optimum phase lag value is manually entered by adjusting a potentiometer so that the error signal will be zero when the motor is operating at its optimum phase lag condition. When the mechanical load on the motor changes, the phase angle between the voltage and current waves will also change. This action results in a control signal being developed for returning the phase angle to the present optimum value.

The system of the present invention, while related to the Nola arrangement, differs therefrom in that it is a fully adaptive, closed-loop controller for varying the duty cycle of the voltage applied to the motor being controlled. By increasing the time delay from the zero-crossing of the applied voltage signal to the point where that voltage is applied to the motor, it is possible to improve motor efficiency. Then, if the motor's mechanical load undergoes a change, the firing angle also changes, the system serving to adaptively track the optimum operating condition. Further, the system of the present invention offers the advantage of providing the optimal reduced voltage to the motor even as the motor's mechanical load changes. The apparatus of the Nola Patent being non-adaptive, it is unable to track a varying optimum value, but instead, merely functions to return an operating parameter to a preset operating point. Stated otherwise, instead of zeroing in on a preset value of voltage, current or phase angle, the controller of the present invention seeks out the optimum operating point upon changes in the mechanical load on the motor's shaft. In this regard, the system of the present invention bears a relationship to the control scheme described in the Schweitzer U.S. Pat. No. 3,142,967 as well as the later Schweitzer et al U.S. Pat. Nos. 4,026,251 and 4,130,863 in that in each of these patents, an optimum setting of a control parameter is sought out by first introducing a relatively slow acting perturbation termed a "dither" of the control parameter setting and then noting wheher the change thus introduced results in improved output performance of the mechine being controlled. If the dither in a given direction of the machine parameter does, in fact, result in improved performance, the controller acts to further adjust that control parameter in the same direction. However, if a degradation in performance is noted, then the machine control parameter is adjusted in the opposite direction until improved performance is again achieved.

SUMMARY OF THE INVENTION

In the closed-loop controller arrangement of the present invention, a triggerable electronic switch is coupled in series with the electric motor to be controlled across the AC supply mains. By controlling the time that a firing pulse is applied to the electronic switch relative to the zero-crossing of the AC voltage, i.e., the firing angle, the average power delivered to the motor can be controlled.

The controller of the present invention causes triggering pulses to be applied to the electronic switch in such a fashion that the firing angle is perturbated at a relatively low rate relative to a set-point value which value is continuously up-dated at the end of each cycle of perturbations. Changes in motor current are sensed and multiplied in an analog multiplier circuit with a signal proportional to the polarity of the line voltage to thereby yield a signal proportional to the instantaneous power being drawn by the motor. This signal is integrated to provide a value proportional to average power during one-half cycle of the dither period. Further circuitry is provided for adjusting the firing angle in one direction or the other depending upon whether the efficiency of the motor had been improved or degraded by the dither operation, the change being in a direction to result in an improvement in the overall motor efficiency.

The system further includes means whereby full motor torque may be developed upon the application of AC voltage to the motor with the controller coming into play only after the starting current has dropped to a nominal value.

OBJECTS

It is accordingly the principal object of the present invention to provide an improved, closed-loop, adaptive controller for optimizing the efficiency of an electric motor.

Another object of the invention is to provide an adaptive controller which will seek an operating point corresponding to maximum efficiency upon change in the mechanical loading of the motor.

Still another object of the invention is to provide a motor control circuit for varying the firing angle of the applied voltage so that the firing angle will correspond to an operating point of maximum efficiency.

Yet another object of the invention is to provide a motor control circuit including means for varying the firing angle of an electronic switch disposed between the motor and its voltage supply wherein the firing angle is first perturbated at a predetermined, relatively low rate relative to a given firing angle setting with means being provided to determine whether that perturbation results in an improvement in efficiency such that the direction of firing angle adjustment for additional correction can be determined.

These and other objects and advantages of the invention will become apparent to those skilled in the art from the following detailed description of a preferred embodiment when considered in conjunction with the accompanying drawings.

DESCRIPTION OF THE PREFERRED EMBODIMENT

Figure 1A:
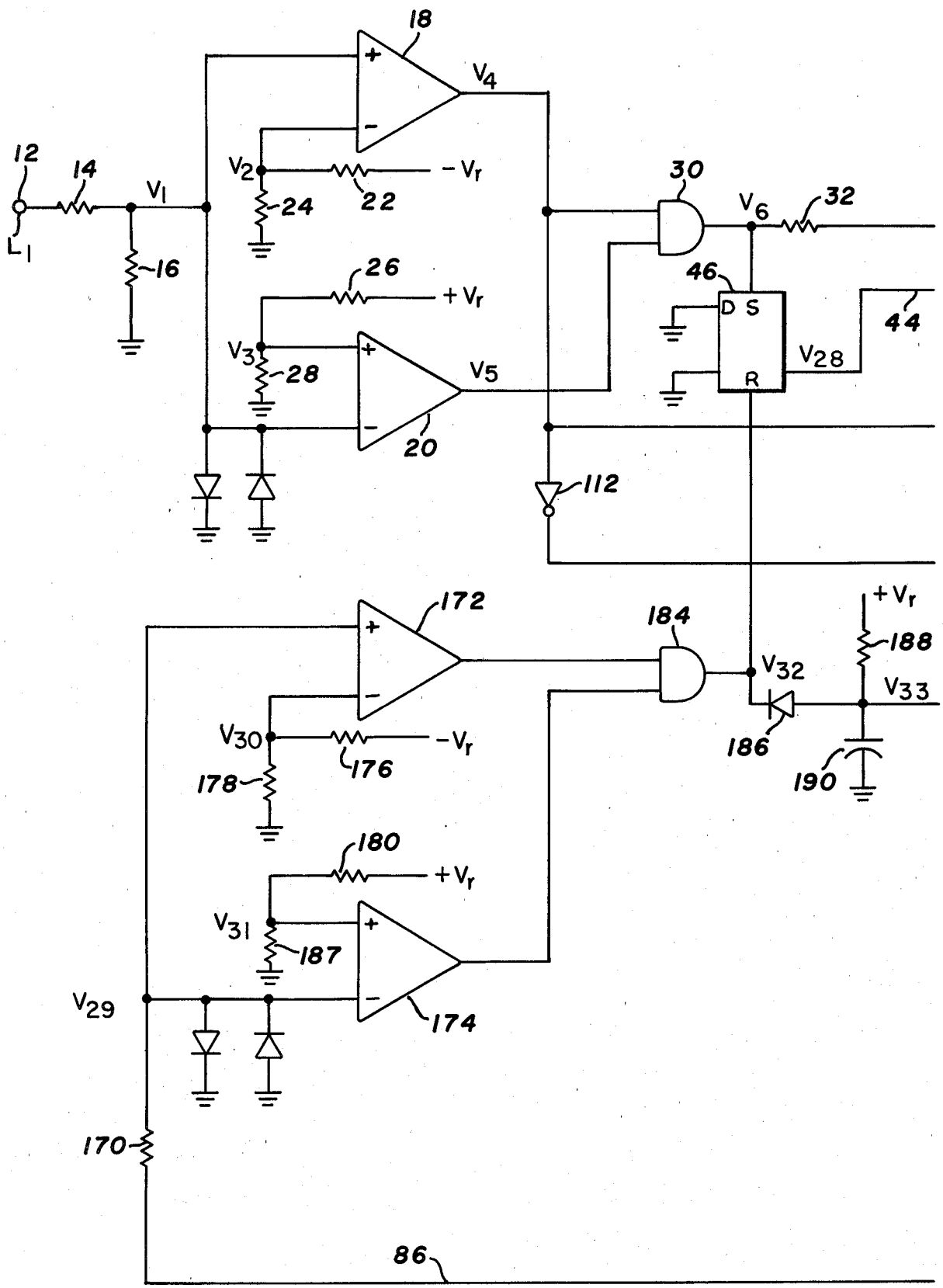
FIGS. 1A, 1B and 1C, when arranged side-by-side, depict by means of an electrical schematic diagram a preferred embodiment of the invention.
Figure 1B:
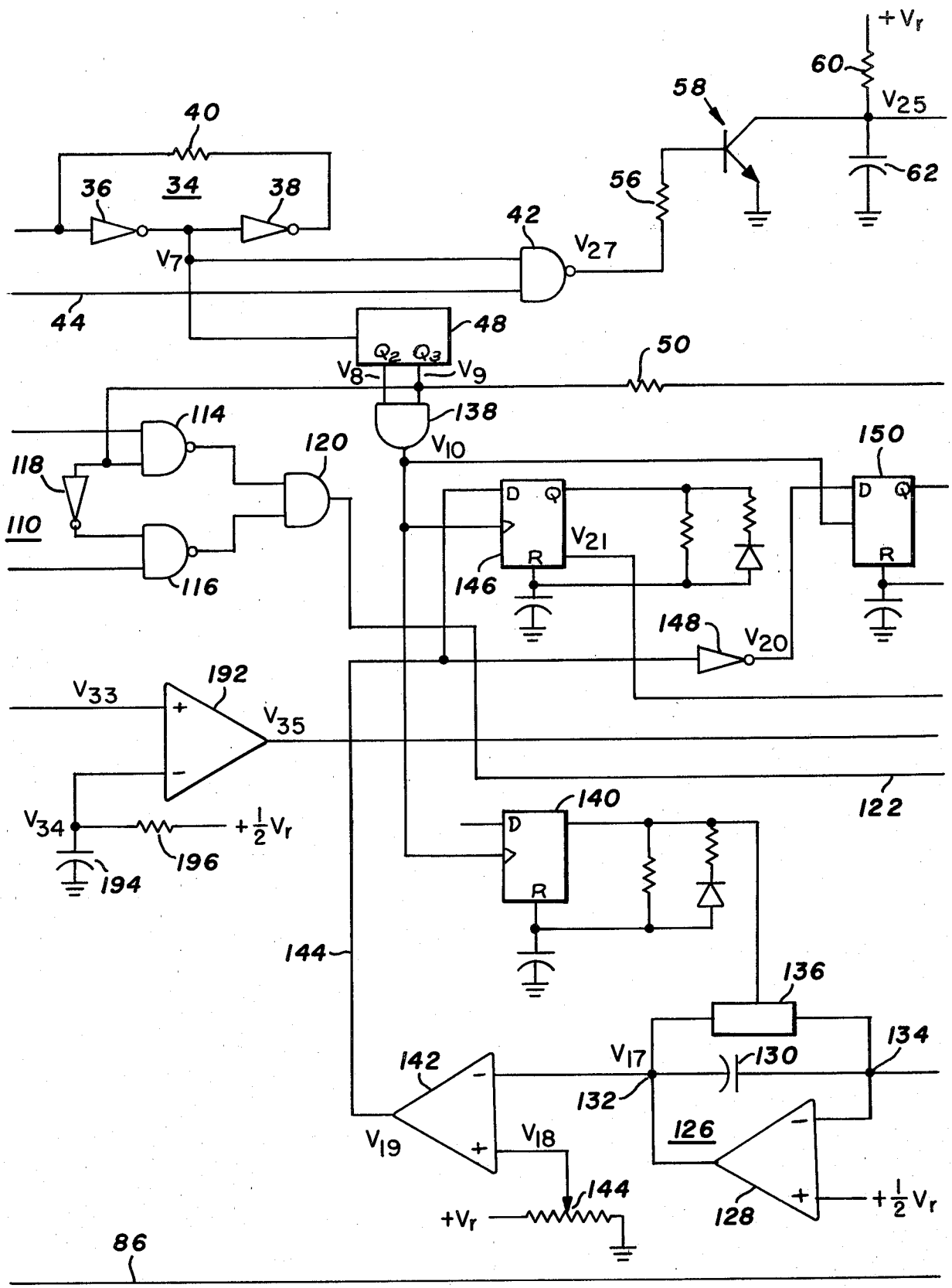

A schematic diagram illustrating the preferred embodiment and best mode contemplated for practicing the invention is set forth in FIGS. 1A and 1B. Line voltage, which may typically be 120 volts, 60 Hz alternating current, is adapted to be applied to a terminal 12 labeled $L_1$ and a fraction of this voltage determined by the voltage divider resistors 14 and 16 is applied as a first input to a pair of comparators including comparators 18 and 20, respectively. The voltage $V_1$ appearing at the output of the voltage divider is applied to the true input of comparator 18 and to the complementary input of the comparator 20. Applied to the complementary input of the comparator 18 is a reference voltage $V_2$ developed at the output of the voltage divider including resistors 22 and 24. The voltage $V_2$ is then a fraction of the applied reference voltage $-V_r$. In a similar fashion, resistors 26 and 28 function as a voltage divider coupling the source $+V_r$ to the true input of the comparator 20. The reference voltages $V_2$ and $V_3$ applied to the comparators 18 and 20, respectively, are chosen such that the comparator output signals $V_4$ and $V_5$ are slightly overlapped. These two outputs are applied as inputs to an AND gate 30 such that the output therefrom, $V_6$ comprises a pulse train of short duration pulses occurring at a rate of 120 Hz.

The output from gate 30 is coupled through a resistor 32 to the input of a Schmitt trigger circuit indicated generally by number 34. The Schmitt trigger circuit includes a pair of serially connected inverters 36 and 38 with a feedback resistor 40 joining the output of the inverter 38 back to the input of the inverter 36. The output from the Schmidt trigger circuit is obtained at the junction between the inverters 36 and 38 and comprises a voltage $V_7$ which, too, is a 120 Hz signal train with the individual pulses therein coinciding with the zero-crossing of the applied AC input voltage. The output from the Schmidt trigger 34 is applied as a first input to an AND gate 42. The other input to this gate comes by way of a conductor 44 from the Clear output terminal of a set-reset flip-flop 46. The set input to this flip-flop is connected to the output of the aforementioned AND gate 30.

The output from the Schmidt trigger 34 is also applied to the Count input of a binary up-counter 48 which functions as a frequency divider producing outputs at the terminals $Q_2$ and $Q_3$ which are a predetermined submultiple of the applied 120 Hz input signal. The output from terminal $Q_2$ is labeled $V_8$ and the output from stage $Q_3$ of that counter is identified as a voltage waveform $V_9$.

The output from stage $Q_3$ of the counter 48 is coupled through a resistor 50 to a junction point 52 and from there to the complement input of an operational amplifier 54 which is connected to function as a comparator. The other input to comparator 54 comes from the output of NAND gate 42 by way of a coupling resistor 56, a semiconductor switch 58 and a timing circuit including a resistor 60 and a capacitor 62. The output electrodes of the semiconductor switch 58, here shown as an NPN transistor, are coupled in parallel with the timing capacitor 62 such that when the switch 58 is rendered conductive, the capacitor 62 is discharged and when the semiconductor switch 58 is subsequently rendered nonconductive, a current flows from the source $+V_r$ to charge the capacitor 62 via the resistor 60.

The output from comparator 54 is identified as a voltage, $V_{26}$, and is coupled through a resistor 64 and a diode 66 to the gate or trigger electrode of a triggerable semiconductor switch, here shown as a dual Triac circuit 68. The Triacs $T_1$ and $T_2$ are interconnected to function as a bi-directional switch with $T_1$ being trigger sensitive and $T_2$ being a high power device. They are operatively connected in a series relationship with the motor 70 whose efficiency is to be controlled and the series combination is connected across the voltage input terminals $L_1$ and $L_2$. A resistor of small ohmic value 72 is also connected in this series circuit and functions as a current sensor. As is conventional with many Triac arrangements, it may be desirable to include a snubber circuit in parallel therewith and including a resistor 74 and a capacitor 76 to aid in reducing any radio frequency interference that might be generated as a result of the switching of a highly inductive load.

The voltage, $V_{11}$, which is proportional to the motor current flowing through the resistor 72 is coupled through a resistor 78 to an input of a direct coupled amplifier 80. The other input to this amplifier is connected to a point of fixed potential such as ground. A feedback resistor 82 couples the output terminal 84 of the amplifier back to its input terminal. The signal, $V_{12}$, appearing at the junction 84 is thus proportional to load current. It is coupled by a conductor 86 and a resistor 88 to the negative input of a unity gain inverter 90. The operating point for this inverter is derived from the bias source $V_r$ by way of resistors 92 and 94. The positive input of the unity gain amplifier 90 is connected to a different source of reference voltage $+\frac{1}{2}V_r$, the result being that the signal $V_{12}$ is shifted so as to be centered upon a baseline which is displaced from the zero axis so as to be compatible with CMOS devices.

The output from the unity gain amplifier 90 is identified as voltage $V_{13}$ and this signal is applied as an input to a CMOS semiconductor switch 96 and via a resistor 98 to the negative input terminal of a further operational amplifier 100 which, too, is arranged to perform as a unity gain inverter. A feedback resistor 102 couples the input of the inverter to its output to provide the requisite feedback. Again, a source of reference potential, $\frac{1}{2}V_r$, is applied as an input to the + terminal of the inverter 100. The output from inverter 100, $V_{14}$, is connected to an input of a further CMOS semiconductor switch 104. Depending upon which of the semiconductor switches 96 or 104 is conductive, either the voltage, $V_{13}$, or its complement, $V_{14}$, will appear at the junction 106.

The switch 96 is arranged to be turned on by a voltage, $V_{15}$, while the switch 104 is rendered conductive by an appropriate voltage, $V_{16}$. The voltages $V_{15}$ and $V_{16}$ are the complement of one another by virtue of the inverter 108. The drive signals for these two switches are derived from an exclusive OR circuit 110 which includes the inverter 112, NAND gates 114 and 116, the inverter 118 and an AND gate 120. The output from comparator 18 ($V_4$) is connected as an input to the gate 114 and its complement is applied as an input to the gate 116 via inverter 112. The dither output signal, $V_9$, from the counter 48 is applied as a second input to NAND gate 114 and the inverted version of that signal is applied as a second input to the NAND gate 116. Hence, the output from AND gate 120 comprises the Exclusive OR of the signals $V_4$ and $V_9$ and this is the signal which is used to drive the integrated circuit switch 104 and the switch 96 via inverter 108.

The signal appearing at junction 106 is proportional to the instantaneous power being drawn by the motor 70, assuming that the line voltage remains constant. This value is coupled through a resistor 124 to the input of the system integrator identified generally by numeral 126.

As is illustrated, the integrator comprises an operational amplifier 128 having a capacitor 130 connected as a feedback element from the output terminal 132 to the negative input terminal 134. The + input terminal is arranged to be connected to a point of reference potential $+\frac{1}{2}V_r$. A further semiconductor switch 136 is operatively connected in a parallel relationship across the capacitor 130 and when rendered conductive may be used to reset the system integrator by removing the charge of the capacitor. The manner in which this is accomplished will be explained later. Suffice it to say for now, the outputs $Q_2$ and $Q_3$ of the integrated circuit counter 48 are applied as inputs to AND gate 138 and the output from that gate is applied as a trigger to a positive edge triggered one-shot circuit 140 whose output, then, drives the integrated circuit switch 136.

The output from the system integrator, $V_{17}$, is applied as an input to a further comparator circuit 142 whose output input is coupled to a reference voltage $V_{18}$ derived from a potentiometer network 144. When the signal appearing at the junction 132 exceeds the reference established by the potentiometer 144, the comparator 142 will produce an output signal for determining whether the control parameter, i.e., the firing angle of the Triac 68, is to be increased or decreased. Specifically, the output from comparator 142 is connected by a conductor 144 to the D input of a one-shot circuit 146 and via an inverter 148 to the D input terminal of a further one-shot circuit 150. The trigger inputs to these two one-shot circuits comprise the output from AND gate 138. Thus, at the completion of each dither interval defined by $V_9$, either one-shot 146 or one-shot 150 will be triggered, the particular one being dependent upon the output from the comparator 142.

The $\overline{Q}$ output from one-shot 146 is coupled through a diode 152 to a junction point 154 and the Q output of the one-shot 150 is coupled through an oppositely poled diode 156 to that same junction 154. A resistor 158 is employed to couple the junction 154 to a first (negative) input of a further integrator circuit 160 which comprises the system timing control generator. The other (positive) input of this integrator is coupled to a source of reference potential $+\frac{1}{2}V_r$. The integrating capacitor 162 is coupled as a feedback element from the output of operational amplifier 160 back to its negative input. Furthermore, a diode 164 is connected directly in parallel with the integrating capacitor. The integrator 160 accumulates and holds past values of the firing angle threshold for the Triacs 68 until that past value is updated at the end of each dither cycle. The output from the integrator 160 is applied by way of conductor 166 and a resistor 168 to the junction point 52 to which the negative input of the comparator 54 is connected.

The signal, $V_{12}$, proportional to the instantaneous motor current appearing at junction point 84 at the output of the amplifier 80 is also coupled through a resistor 170 to the true and complement input terminals, respectively, of further comparators 172 and 174. The negative input terminal of the comparator 172 is held at a predetermined value $V_{30}$ by means of a voltage divider including the resistors 176 and 178 which are coupled to a source of reference potential $-V_r$. In a similar fashion, the positive input of the comparator 174 is held at a reference potential $V_{31}$ by means of a voltage divider including the resistors 180 and 187 which are coupled to a reference source $+V_r$.

The respective outputs from the comparators 172 and 174 are connected as separate inputs to AND gate 184 whose output is coupled to the Reset terminal of the flip-flop 46 and through a semiconductor diode 186 to a RC timing network including resistor 188 and capacitor 190. The junction point between these two components is connected to the + input of operational amplifier 192. The negative input of this sample amplifier is connected to receive a voltage $V_{34}$ appearing at the junction point between a grounded capacitor 194 and a resistor 196 whose other terminal is coupled to a reference voltage $+\frac{1}{2}V_r$. The output from operational amplifier 192 is coupled through a diode 198 and a resistor 200 to the negative input terminal of the integrator circuit 160. This same input terminal is coupled through a further resistor 202 to the wiper arm of a potentiometer 204 which is driven by a voltage $V_r$.

Now that the details of the construction of the preferred embodiment have been set out, consideration will next be given to the mode of operation of the system in optimizing the efficiency of an electric motor as the mechanical loading on the shaft of that motor is changed. In this regard, the waveforms set out in FIGS. 2 and 3 of the drawings will aid in the overall understanding.

OPERATION

The control system of the present invention is premised on the fact that the efficiency of an AC induction motor can be improved by controlling the amplitude of the voltage applied to the motor. It is well known that such amplitude control can be obtained by utilizing bidirectional switches such as Triacs which are connected in series between the motor and its AC supply. By controlling the turn-on time of the Triacs relative to the zero-crossing of the applied AC input voltage, the desired control can be attained. This time interval from the zero-crossing of the power line voltage to the time that the switching circuit is triggered is commonly referred to as the "firing angle".

If the motor being controlled is an induction motor and it is very lightly loaded, the effective AC load is quite inductive. By increasing the firing angle of the Triac switches, the controller can make the motor operate more efficiently. If the motor's mechanical load undergoes a change, the optimum firing angle also changes. The control circuit of the present invention function to adaptively tack the optimum setting for the Triac firing angle as the motor's mechanical load changes and in this regard differs in substance from the system of the aforereferenced Nola Patent.

Figure 2:
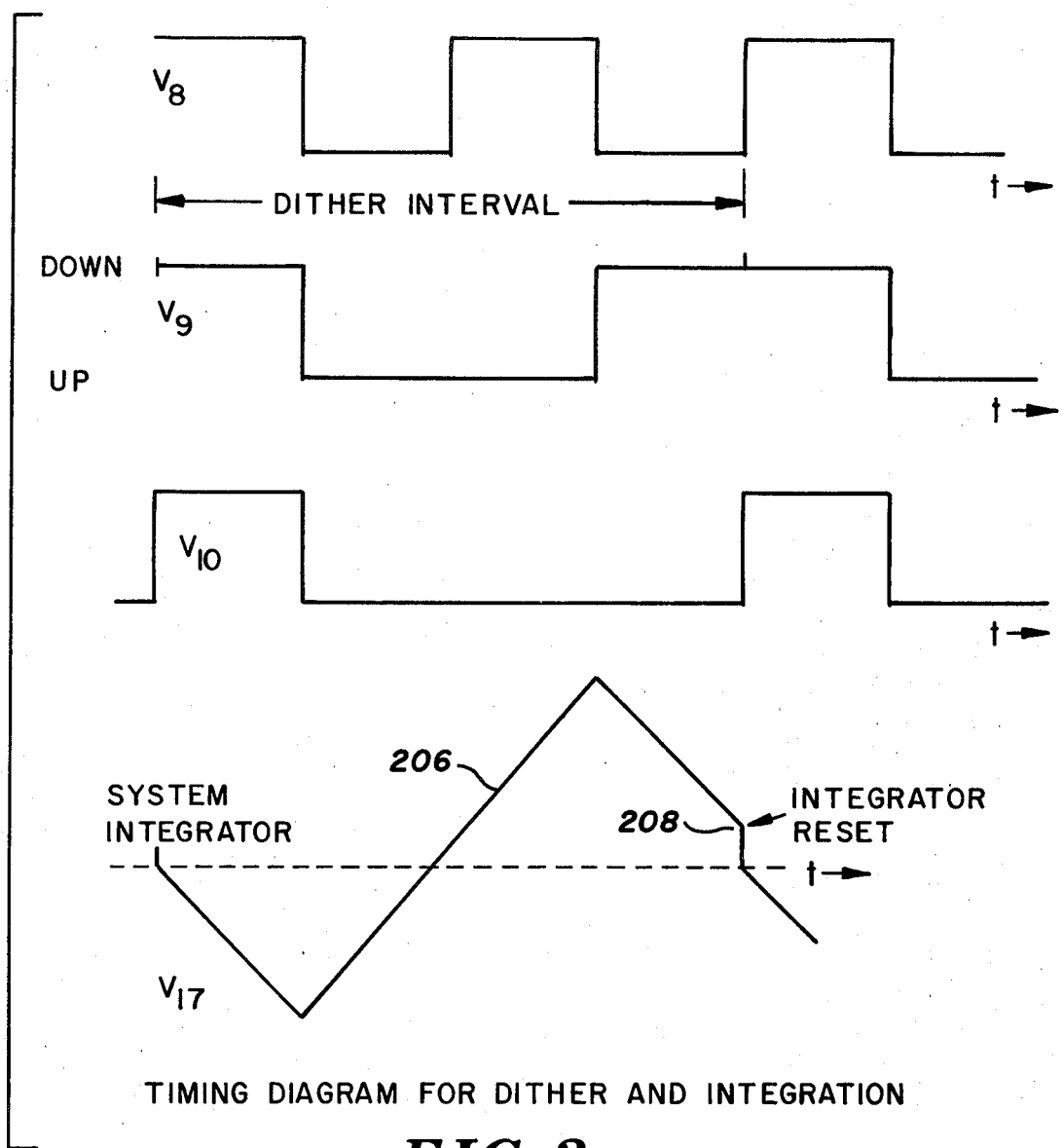
FIG. 2 illustrates various waveforms associated with the diagram of FIG. 1, which waveforms are helpful in understanding the operation of the preferred embodiment.

With reference to FIG. 1B, the overall timing of the controller is established by the counter 48 which functions to count the zero-crossings of the applied line voltage. More particularly, with the AC line voltage applied to the $L_1$ terminal 12, a fraction of that input, $V_1$, is applied to the inputs of the comparators 18 and 20. The reference voltages applied to these two comparators ($V_2$ and $V_3$) are chosen so that the comparator outputs $V_4$ and $V_5$ are slightly under a 50% duty cycle and are thus overlapped. With this overlapped relationship, then, the AND gate 30 will output a pulse train with the pulses occurring at a 120 Hz rate (assuming a 60 Hz line frequency). When these 120 Hz signals are applied to the Schmidt trigger 34, the leading and trailing edges thereof are sharpened to produce square wave pulses at the 120 Hz rate. The output pulses, $V_7$, are applied to the counter 48 and, accordingly, the counter is advanced at a rate of 120 counts per second. The counter functions as a frequency divider in that a predetermined number of pulses must be received before the output $V_8$ goes high and still further inputs must be received before the output $V_9$ goes high. Assuming that the signal $V_8$ is obtained at stage $Q_2$ of a binary counter 48 while the signal $V_9$ is obtained from its stage, $Q_3$, the frequency of the waveform $V_9$ will be 15 Hz while the frequency of the waveform $V_{10}$ will be 7.5 Hz. Referring to FIG. 2, the waveforms of the signals $V_8$, $V_9$ and $V_{10}$ are illustrated. As will be set forth in greater detail hereinbelow, the rising edge of the output from the gate 138 establishes the end of the system's dither cycle and it is at this time that the one-shot circuit 140 is triggered to produce a reset to the system integrator 126 via the semiconductor switch 136. Furthermore, it is at this time the appropriate correction is made to the analog signal held in the timing generator comprised of the integrator 160.

The signal $V_9$, when applied to the comparator 54 via the resistor 50, functions to introduce a perturbation in the firing angle of the Triac cicuit 68 in that it introduces a shift in the level which the capacitor 62 must be charged to before the comparator 54 can produce an output to the Triac's trigger circuit $T_1$. This is illustrated graphically in FIG. 3.

The response of the system to the minute change in firing angle occasioned by the dithering is observed by monitoring the current drawn by the motor. The change in current will develop a corresponding change in voltage across the small motor current sensing resistor 72 and this resulting voltage is amplified by the high gain amplifier 80. Thus, the voltage $V_{12}$ is proportional to the instantaneous motor current.

Because CMOS FET-type switches are utilized to perform a current x voltage multiplication to achieve a signal proportional to instantaneous power, it is necessary to employ the unity gain inverters 90 and 100 to perform a level-shifting function, the result being that the current waveform is centered about a baseline which is offset from zero by $\frac{1}{2}V_r$. Thus, the true and complement value of the signal proportional to motor current is applied as an input to the FET semiconductor switches 96 and 104. The control voltages to these last-mentioned switches are driven at a 120 Hz rate which is derived from the zero-crossings of the voltage wave $V_4$. Specifically, if either $V_4$ or $V_9$ (from counter 48) are high, but not simultaneously, the Exclusive OR circuit 110 will be satisfied and AND gate 120 will output a signal on line 122 for momentarily and alternately turning on the switches 96 and 104 at the 120 Hz rate.

Those skilled in the art will recognize that the synchronous enabling of the switches 96 and 104 corresponds to multiplication of the signal proportional to motor current by a +1 or a −1 at the 120 Hz rate. In this way, a multiplication of signals proportional to the applied line voltage (which is assumed to be a constant amplitude) by the actual current drawn by the motor load is achieved. The signal developed at junction 106, then, is directly proportional to the instantaneous power. By applying the signal to the system integrator 126, an averaging operation takes place during the period of the dither cycle.

To ensure that averaging takes place only during a given dither cycle the CMOS-FET semiconductor switch 136 is provided. Referring to the waveforms of FIG. 2, at the beginning of the dither cycle, the system integrator is reset by the output from the one-shot circuit 140 which, in turn, is triggered by the output from AND gate 138, i.e., the waveform $V_{10}$. As already mentioned, the output from stage $Q_3$ of the counter 48 is used to apply a dither to the firing angle of the Triac circuit 68. The signal, $V_9$, acting through the Exclusive OR circuit 110, also controls the switching of the inputs to the system integrator 126, making it integrate either up or down, depending upon whether switch 96 or switch 104 is closed. The waveform 206 in the lowermost waveform of FIG. 2 represents the output from the system integrator 126 in a somewhat idealized form in that it is assumed that the input voltage remains constant. One would normally observe some variation in this wave when the effects of the switching of the devices 96 and 104 are taken into account. However, the waveform 206 fairly represents the average or mean of the system integrator output.

In its simplest form, the master timing for the system is based upon quarter-cycles as illustrated. By choosing stages $Q_2$ and $Q_3$ of the counter 48 as the sources for the voltages $V_8$ and $V_9$ and with a 60 Hz line voltage frequency, the dither cycle rate will be 7.5 Hz. By choosing other counter outputs (not shown) it is possible to select other dither rates. It has been found, however, that with a 7.5 Hz dither frequency, there is no significant audible output from the motor occasioned by the dithering.

Figure 3:
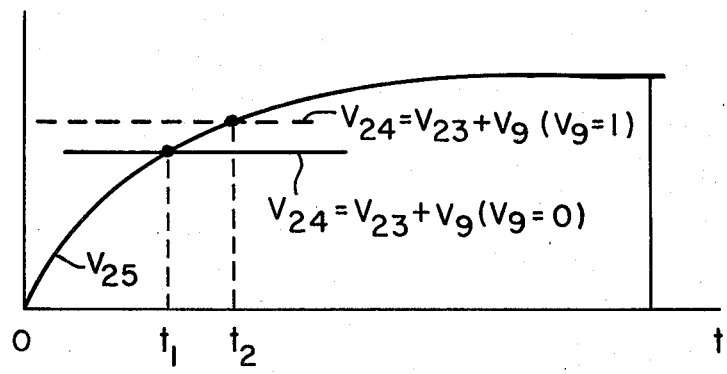
FIG. 3 is a further waveform showing the manner in which the firing angle is varied.

With reference to FIG. 3, the dither signal, $V_9$, acting through the comparator 54, causes a shift in the firing angle of the Triacs 68 about the control setting determined by the output, $V_{23}$, from the integrator circuit 160. If the system response is improved by the dither produced by the signal $V_9$, the system integrator 126 ramps more slowly during that portion of the dither cycle. Hence, at the end of the cycle, the output from the system integrator, $V_{17}$, is above its initial value as indicated at 208 in FIG. 2. The comparator 142 recognizes this fact and initiates an appropriate correction to the timing established by the timing generator integrator 160.

The reference voltage applied to the comparator 142 from the potentiometer 144 is initially adjusted to match the initial reset value of the integrator 126 and, as such, the polarity of the output from the comparator 142 determines whether the system operation has been improved or degraded during the dither cycle in question.

The up/down integrate switches 96 and 104 are controlled by the signal $V_{16}$ and its complement $V_{15}$. The signal $V_{16}$ is the Exclusive OR of the line voltage crossings $V_4$ and the dither waveform $V_9$ and that signal provides both the synchronous multiplication of average instantaneous motor current with a unit voltage to yield a signal proportional to instantaneous power and it further governs the up/down control of the system integrator 126.

Again with reference to waveform 206 of FIG. 2, by noting the polarity of the offset 208 at the completion of the dither cycle, it can be determined whether the dithering resulted in improved or degraded performance. The output from the comparator 142 is tested at the end of the dither cycle to make this determination. Depending upon the polarity of the signal $V_{19}$ at the end of the dither cycle, either one-shot 146 or one-shot 150 will be triggered by the rising edge of the signal $V_{10}$ (FIG. 2). If $V_{19}$ is high, it will be one-shot 146 which is triggered whereas if the signal $V_{19}$ is low, it will be the output from the inverter 148 that will permit one-shot circuit 150 to be triggered instead of one-shot 146. When the output from the comparator 142 is such that the one-shot 146 is triggered, the signal coupled through diode 152 and appearing at junction 154 will be a negative going excursion, lasting for a period determined by the timing components of the one-shot 146. However, when one-shot 150 is selected, the signal coupled through the diode 156 and appearing at the junction 154 will be a positive going pulse which, again, will persist for a length of time determined by the timing components of the one-shot circuit 150. One or the other of these signals will be coupled to the integrator 160 of the system's timing generator by way of coupling resistor 158.

It will be recalled that the output from the timing generator integrator 160, i.e., the control voltage $V_{23}$ represents the accumulation of past values applied to it and it instantaneously determines the set point value for the firing angle of the Triacs 68. Stated otherwise, the integrator 160 holds the desired timing value and is either incremented by the output from one-shot 146 or is decremented by the output from one-shot circuit 150. The potentiometer 204 is provided as a means for nulling out long term offset drifts. The diode 164 provides a hard limit on the maximum permissible firing angle of the Triacs 68 and thereby serves to avoid motor stall-out. The output signal from the timing generator 160 is coupled through the resistor 168 and at junction 152 is combined with the dither waveform $V_9$ to provide a composite timing waveform $V_{24}$.

The firing of the Triac circuit 68 on each half-cycle of the line voltage is controlled by the output from the comparator 54. The RC timing network, including resistor 60 and capacitor 62, may periodically be reset each time the semiconductor switch 58 is rendered conductive. As will be explained in greater detail below, the semiconductor switch 58 is rendered conductive upon the zero-crossing of the applied voltage and is turned off at the time that the motor current waveform crosses zero. It can be seen, then, that the voltage on capacitor 62 ($V_{25}$) begins charging towards the positive reference voltage $V_r$.

When the exponentially rising voltage $V_{25}$ passes through the threshold established by $V_{24}$, comparator 54 will output a positive signal, forward biasing the diode 66 and triggering the trigger sensitive Triac T1. When it fires, it, in turn, fires the power Triac, T2, this action connecting the motor 70 across its supply mains L1 and L2.

Referring to FIG. 3, then, a graphical representation of the manner in which the firing angle is shifted and timed is set forth. At $t=0$, the semiconductor switch 58 is turned off and the voltage $V_{25}$ begins its exponential rise. Triggering of the Triac T1 occurs only when the voltage $V_{25}$ exceeds the reference voltage $V_{24}$. Thus, when the dither voltage $V_9$ is zero, triggering will occur at time $t_1$. However, when the dither voltage $V_9$ is at its binary "1" level, firing occurs at time $t_2$. The effect of the dither signal is to introduce a minute shift in firing angle followed by an adjustment of the voltage $V_{23}$ in a direction dependent upon whether the incremental change in firing angle improved or degraded the motor's efficiency.

The discharging of the capacitor 62 is controlled by the output from NAND gate 42. Specifically, the voltage $V_{27}$ is driven high by the voltage zero-crossing pulse $V_7$ to remove the drive to the gate of the Triac T1 at the end of each cycle of the applied line voltage. NAND gate 42 also outputs a high signal when the input thereto from the flip-flop 46 is low. This input is set to a low condition by the zero-crossings of the applied AC voltage.

When an inductive load, such as an induction motor, is driven, the motor current lags the line voltage significantly. If the mechanical load on the motor's shaft increases, the motor current rises and the phase angle between the current and voltage waves decreases. If the motor is lightly loaded, the inherent inductance causes the motor current to persist well beyond the point where the line voltage passes through zero. However, if the motor is heavily loaded, the current drops more rapidly to zero following a zero-crossing of the applied voltage. The leading edge of the current wave is determined by the firing of the Triac 68, but its trailing edge depends upon the mechanical load on the motor.

The voltage, $V_{12}$, is proportional to motor current and this signal is applied as an input to the comparators 172 and 174 which are arranged to detect the zero-crossings of the current waveform. The reference voltages to the comparators 172 and 174, i.e., voltages $V_{30}$ and $V_{31}$ are chosen so that if the current is zero, i.e., below a threshold, the output from AND gate 184 is high. This high output functions to reset the flip-flop 46, in turn, causing the semiconductor switch 58 to be turned off and initiating the timing interval. Hence, the timing interval does not begin until the current has gone to zero on the previous half-cycle. Now, if the mechanical load on the motor shaft is suddenly increased so as to make the electrical load appear less inductive, the firing angle is decreased, resulting in an improved transient response of the system.

The controller of the present invention is designed such that if the user turns off the motor by disconnecting it from the supply terminals, the controller is initialized so that when the applied voltage is again turned on, full power will be applied to the motor. This ensures high starting torque. The manner in which this is accomplished will now be explained.

Comparator 192 and its associated RC timing network, including resistor 188 and capacitor 190, perform the reset function. If the motor is turned off by opening an on-off switch (not shown) but the optimizer circuitry of this invention remains energized, zero current is observed and the output from AND gate 184 will be held high. As such, the signal applied to the + terminal of comparator 192 will exceed the reference voltage maintained at its − terminal causing comparator 192 to output a signal $V_{35}$ which drives the input to the integrator circuit 160 below its established threshold. Thus, the output from the timing generator, $V_{23}$, goes to zero. When the motor is turned back on, the initial firing angle will be zero and full power is applied to the motor in the turn-on mode. As time progresses, the controller of the present invention causes the signal $V_{23}$ to slew to the optimum operating point in the manner described.

A similar power-on reset is provided in the event that the line voltage to the optimizer is turned off independently of the motor. Specifically, the resistor 196 and capacitor 194 insert a delay in the application of the potential $V_{34}$ to the comparator 192 upon power turn-on so that the comparator's output $V_{35}$ is again driven positive and forcing the output from the timing generator $V_{23}$ to go to zero. As before, this allows full power to be applied to the motor upon the initial application of AC voltage to the controller.

It may be desirable in some applications to cause the motor to operate away from optimum efficiency by a predetermined amount. That is to say, the actual operating point can be "biased" away from optimum if non-uniform time intervals are chosen for defining the segments of the dither period. In other words, by selecting appropriate output lines from the counter 48, the dither period can be segmented into unequal "halves", the result being that the system will operate to seek a firing angle which permits the motor to operate away from its optimum. Also, it is possible to adjust the setting of the potentiometer 144 providing the reference input to the comparator 142 so as to introduce either a positive or a negative "bias" value into the controller.

Figure 1C:
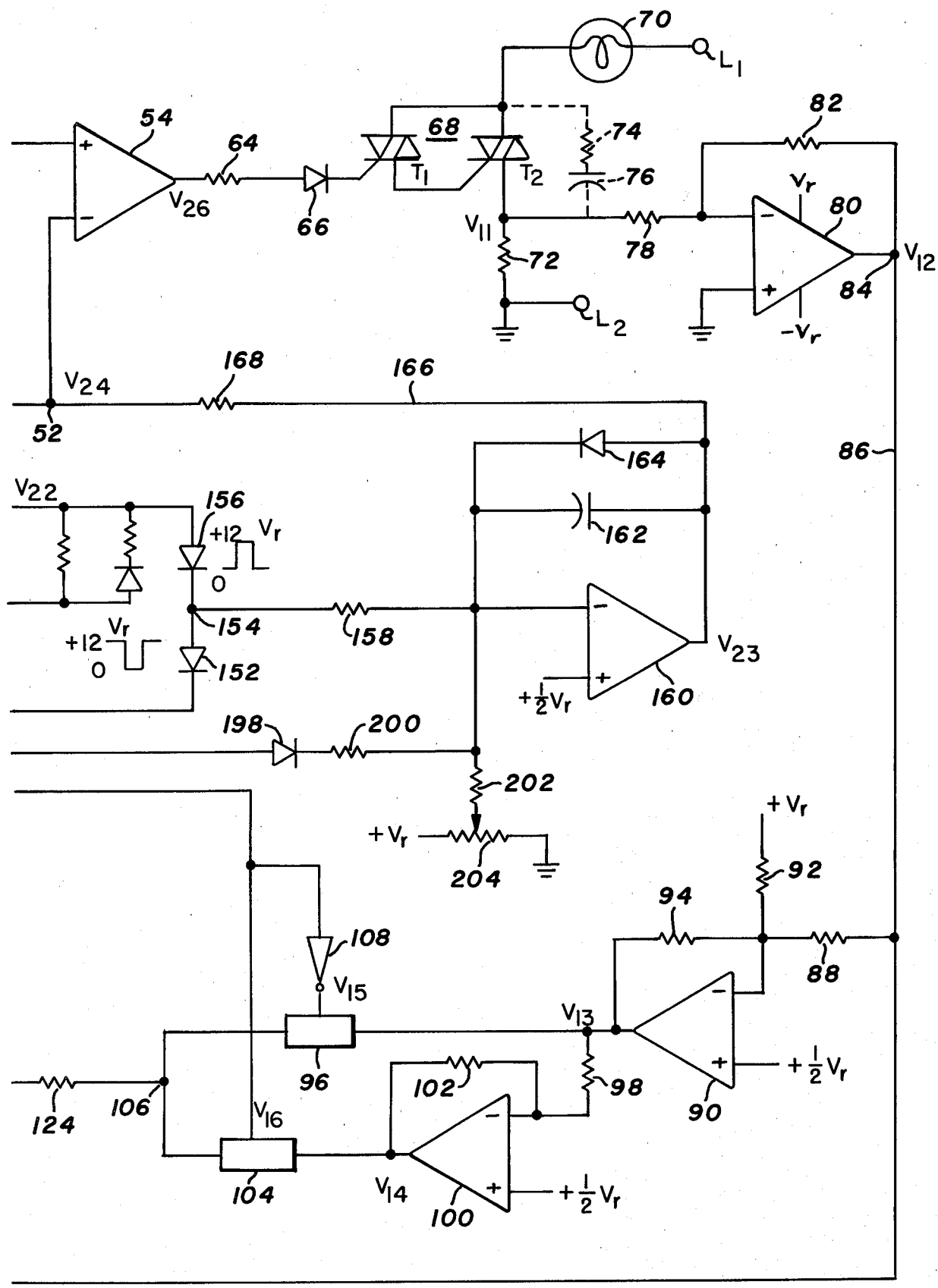

The invention has been described herein in considerable detail, in order to comply with the Patent Statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself. For example, the apparatus of the present invention may readily be applied to multi-phase motors where firing angle of a switching device is used to control energization. Further, various functions such as comparisons, integration, etc., implemented in the circuit of FIG. 1 with operational amplifiers (analog devices) may also be implemented using known equivalent digital integrated circuit devices. Similarly, the controller of the present invention is illustrated as being used with only a single motor as the load. Where an industrial application may require simultaneous control over a plurality of motors, it may prove more expedient to utilize a digital implementation wherein a microprocessor based controller is used as a means of time sharing the optimizer control scheme of the present invention among a plurality of loads. Accordingly, the scope of the invention is to be determined from the following claims.

What is claimed is:

1. In combination with an electric motor of the type having a triggerable electronic switching means connected in series with said motor and across a source of alternating current voltage, means for adaptively adjusting the firing angle of said electronic switching means relative to the zero-crossing of said alternating current voltage upon changes in loading on said motor to optimize the efficiency of said motor, comprising:
   (a) first timing means for repetitively establishing a timing interval which is relatively long compared to the period of said alternating current voltage;
   (b) second timing means adapted to be coupled to said triggerable electronic switching means for setting said firing angle at an initial value at the beginning of each of said timing intervals;
   (c) firing angle dithering means coupled to said triggerable electronic switching means and to said first timing means for perturbating said firing angle about said initial value;
   (d) sampling means coupled to said motor for repetitively sampling the instantaneous power delivered to said motor at a rate which is high compared to the rate at which said firing angle is perturbated by said firing angle dithering means; and
   (e) means coupled between said sampling means and said second timing means for producing a signal for advancing or retarding said firing angle from said initial value depending upon the output from said sampling means.

2. In a system for use with an electric motor, an adaptive controller for optimizing the efficiency of the motor following changes in mechanical loading on said motor, comprising:
   (a) parameter control means coupled in circuit with said motor for controlling the energization of said motor;
   (b) dithering means coupled to said parameter control means for cyclically varying said parameter control means at a predetermined rate;
   (c) sampling means coupled to said motor for repetitively sampling the instantaneous power delivered to said motor at a relatively high rate compared to said predetermined rate;
   (d) comparator means coupled to said sampling means for producing an output indicative of either increases or decreases in average power drawn by said motor during the period of said dithering means; and
   (e) parameter control adjusting means coupled to receive the output of said comparator means and coupled to said parameter control means for changing the energization of said motor means in a direction to improve the efficiency of said motor.

3. Apparatus as in claim 2 wherein said parameter control means comprises:
   (a) a triggerable electronic switch having a pair of output electrodes and a control electrode, said output electrodes being connected in series with the motor and the power source for said motor, said control electrode being coupled to said dithering means and to said parameter control adjusting means.

4. Apparatus as in claim 3 wherein said power source is a source of alternating current voltage of a predetermined frequency.

5. Apparatus as in claim 4 wherein said dithering means comprises:
   (a) frequency dividing means coupled to receive said predetermined frequency and to produce a signal output of a frequency which is a submultiple of said predetermined frequency; and
   (b) means for combining said signal output of said frequency dividing means with the output from said parameter control adjusting means whereby said control parameter is varied at said submultiple frequency.

6. Apparatus as in claim 5 wherein said control parameter is the firing angle of said triggerable electronic switch.

7. Apparatus as in claim 3 wherein said sampling means comprises:

(a) means for sensing instantaneous changes in current flowing through said motor and producing a signal proportional thereto;
(b) means for effectively multiplying said signal proportional to said instantaneous changes in current by a further signal proportional to the amplitude of the voltage applied to said motor to yield signals proportional to instantaneous power delivered to said motor;
(c) signal summing means; and
(d) means coupling said means for multiplying to said signal summing means such that said signals proportional to instantaneous power are added to and subtracted from each other at said relatively high rate during the dither period defined by said predetermined rate.

8. Apparatus as in claim 7 wherein said comparator means produces an output signal indicative of the net value in said signal summing means at the end of said dither period.

9. Apparatus as in claim 8 wherein said parameter control adjusting means comprises:
(a) means coupled to said output of said comparator means for receiving said output signal indicative of said net value for producing a first or a second electrical voltage depending upon said net value; and
(b) means responsive to said first or second electrical voltage for modifying the signal being applied to said control electrode.

10. Apparatus as in claim 6 and further including means for setting said firing angle at zero prior to the connection of said power source to said motor, whereby maximum power is applied to said motor at the start-up thereof.

* * * * *